United States Patent [19]

Sephton

[11] Patent Number: 5,156,706
[45] Date of Patent: Oct. 20, 1992

[54] EVAPORATION OF LIQUIDS WITH DISPERSANT ADDED

[76] Inventor: Hugo H. Sephton, 120 York Ave., Kensington, Calif. 94708

[21] Appl. No.: 187,817

[22] Filed: Apr. 29, 1988

Related U.S. Application Data

[60] Continuation-in-part of Ser. No. 65,808, Jun. 23, 1987, abandoned, which is a continuation of Ser. No. 728,920, Apr. 30, 1985, abandoned, which is a continuation-in-part of Ser. No. 689,631, Jan. 8, 1985, abandoned, which is a division of Ser. No. 415,088, Sep. 7, 1982, Pat. No. 4,511,432.

[51] Int. Cl.$^5$ ............... B01D 1/06; B01D 1/26; B01D 3/34; B01D 3/42
[52] U.S. Cl. ............... 159/47.1; 159/27.4; 159/901; 159/DIG. 2; 159/DIG. 8; 159/DIG. 13; 159/DIG. 16; 159/DIG. 38; 202/174; 202/237; 202/264; 203/1; 203/7; 203/11; 203/22; 203/24; 203/25; 203/40; 203/92; 203/95; 203/DIG. 8; 203/DIG. 17
[58] Field of Search ............... 159/13.2, 27.4, 43.1, 159/47.1, 49, DIG. 4, DIG. 13, DIG. 38, 24.2, 901, DIG. 2, 17.1, DIG. 8, DIG. 16; 203/22, 24, 7, 11, 25, 26, 40, 89, DIG. 18, DIG. 8, DIG. 17, 1, 92, 95; 202/235, 264, 236, 237, 174

[56] References Cited

U.S. PATENT DOCUMENTS

| | | | |
|---|---|---|---|
| 2,181,146 | 11/1939 | Peebles et al. | 159/13.2 |
| 2,672,926 | 3/1954 | Cross | 159/13.2 |
| 3,132,064 | 5/1964 | Scheffers | 159/13.2 |
| 3,243,359 | 3/1966 | Schmidt | 203/DIG. 8 |
| 3,846,254 | 11/1974 | Sephton | 203/11 |
| 3,880,702 | 4/1975 | Troshenkin et al. | 159/43.1 |
| 3,932,224 | 1/1976 | Hirota et al. | 203/7 |
| 3,974,039 | 8/1976 | Frohner et al. | 203/7 |
| 3,997,408 | 12/1976 | Barba et al. | 203/11 |
| 4,201,669 | 5/1980 | Becker | 210/699 |
| 4,255,259 | 3/1981 | Hwa et al. | 210/699 |
| 4,677,168 | 6/1987 | Hoy et al. | 525/441 |
| 4,861,512 | 8/1989 | Gosselink | 252/549 |

FOREIGN PATENT DOCUMENTS

2454999 12/1980 France ............... 203/DIG. 17

OTHER PUBLICATIONS

Stickney et al., "Treating Chemical Wastes by Evaporation", Chemical Engineering Progress, Apr. 1976, pp. 41-46.
Sephton, "Renovation of Power Plant Cooling Tower Blowdown . . . ", EPA-600/7-77-063, Jun. 1977, pp. 12-17.

*Primary Examiner*—Virginia Manoharan

[57] ABSTRACT

A vertical tube evaporation process for the concentration of saline water and other liquids, including the addition of an anionic mono-molecular dispersant thereto which interacts with materials precipitated during concentration and inhibits the formation of scale or fouling depositions on evaporator surfaces, and wherein the additive is incorporated into the precipitated materials and improves their removal during the descaling or defouling of evaporator surfaces by rendering such precipitates redispersable in fresh water or in a non-saturated liquid used for descaling or defouling of evaporator surfaces.

17 Claims, 4 Drawing Sheets

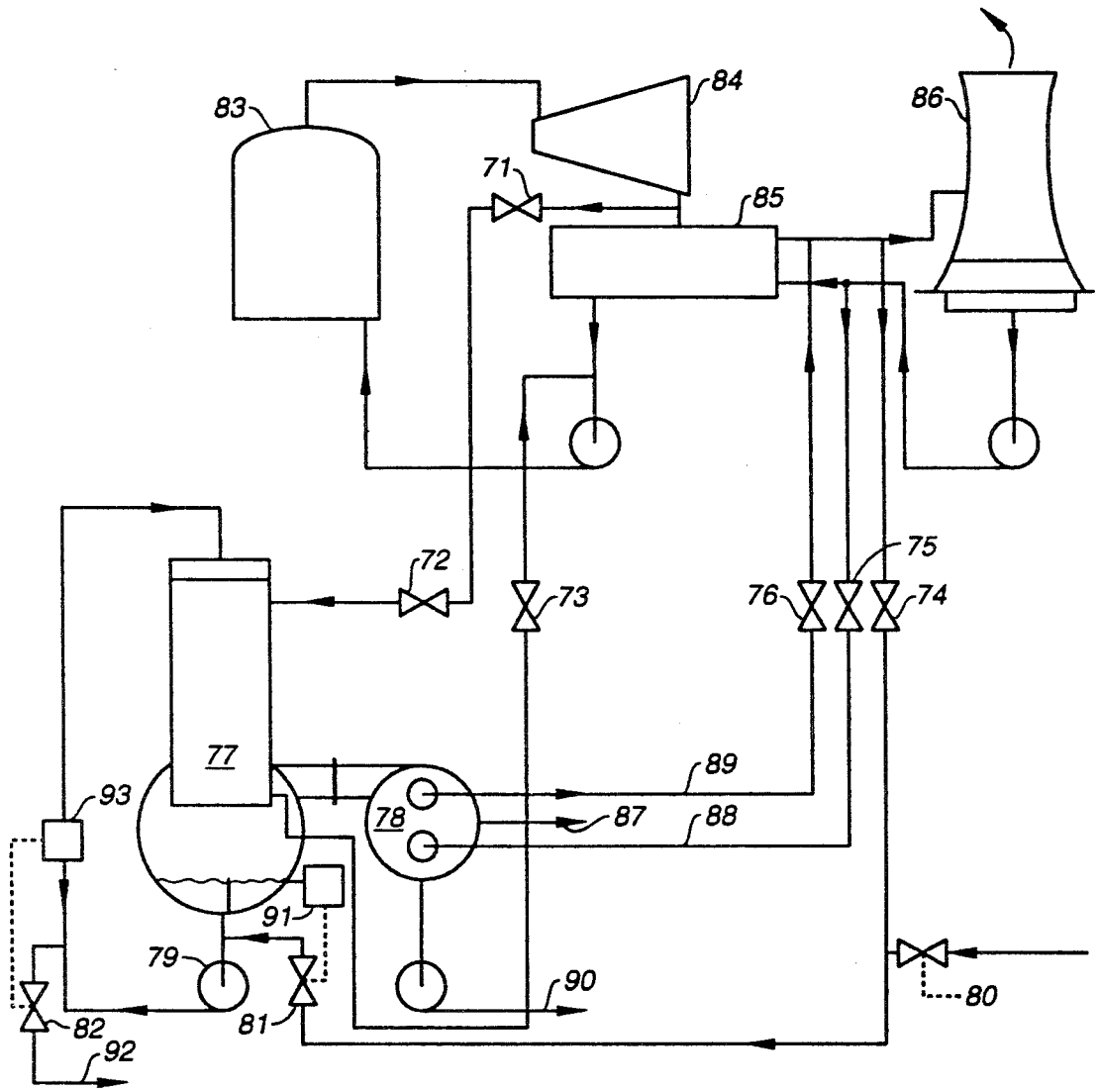
FIG._1

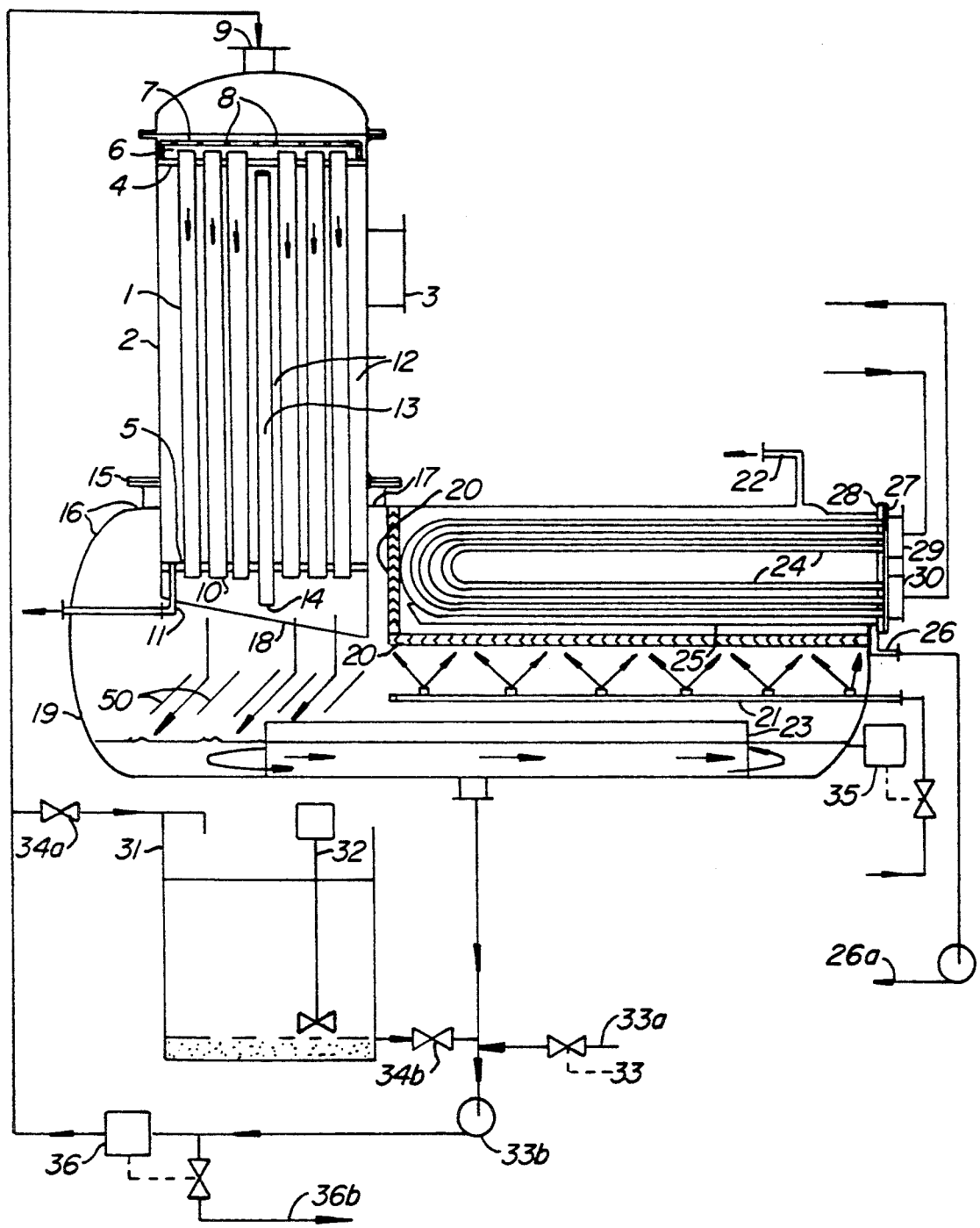
FIG._2.

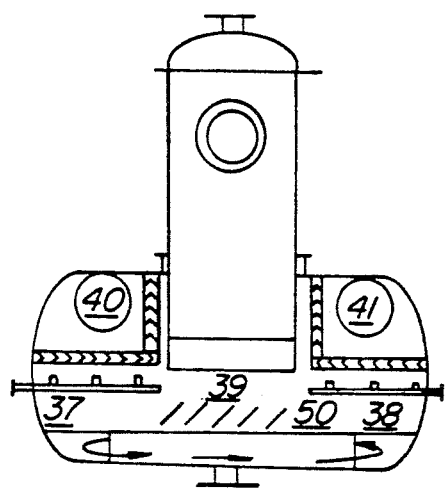
FIG._3a.
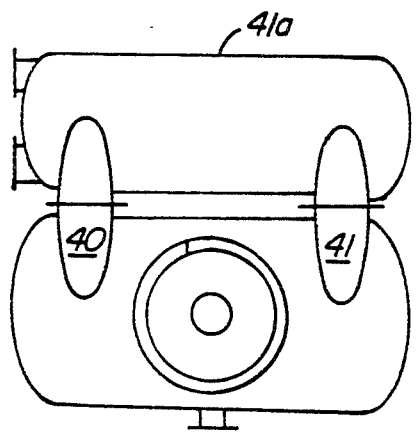
FIG._3b.
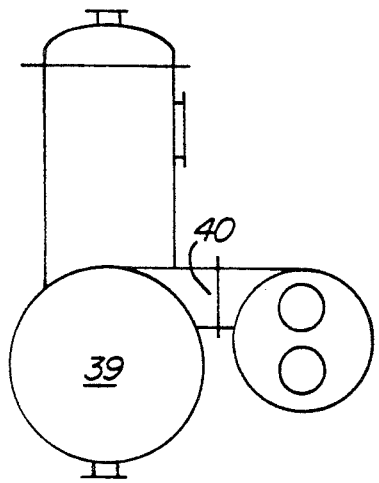
FIG._3c.
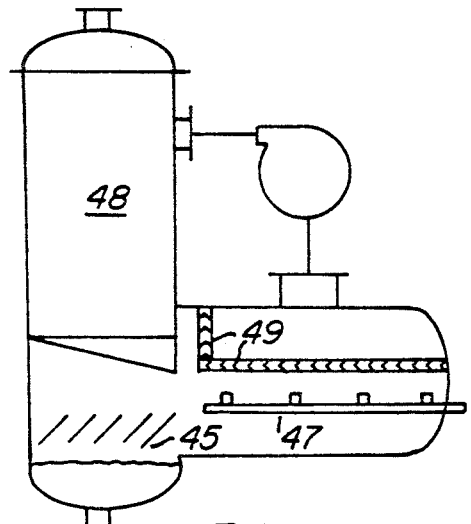
FIG._4c.
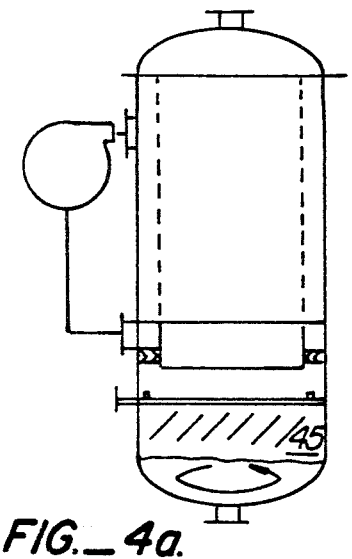
FIG._4a.
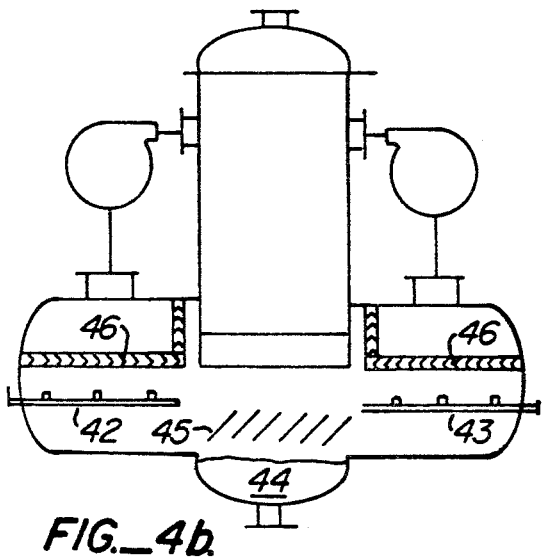
FIG._4b.

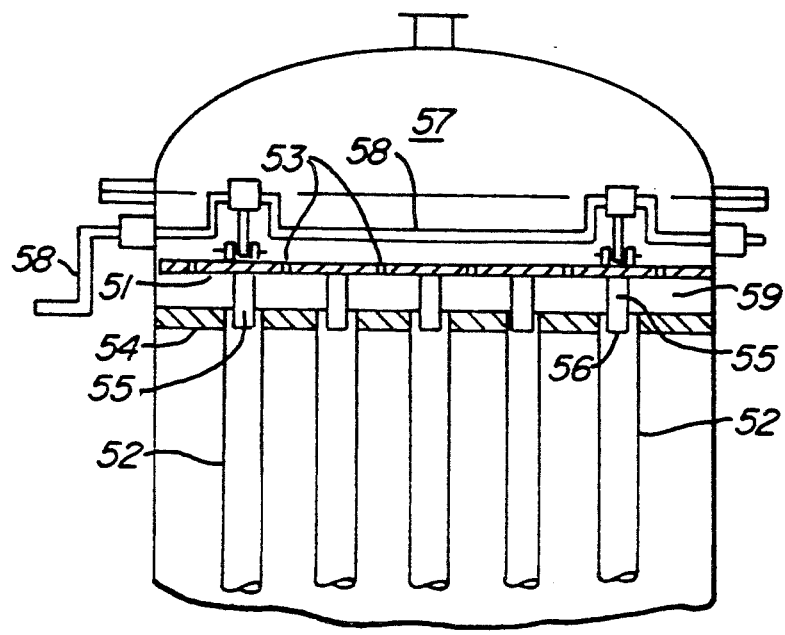
FIG._5.
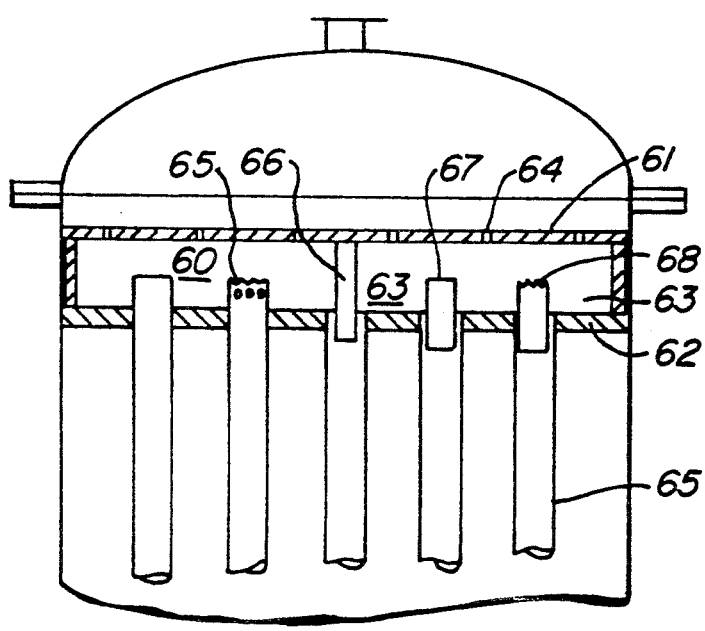
FIG._6.

EVAPORATION OF LIQUIDS WITH DISPERSANT ADDED

CROSS REFERENCE TO RELATED APPLICATIONS

This application is a continuation-in-part of application Ser. No. 07/065,808, filed Jun. 23, 1987, now abandoned; which is a continuation of application Ser. No. 06/728,920, filed Apr. 30, 1985, now abandoned; which is a continuation-in-part of application Ser. No. 06/689,631, filed Jan. 8, 1985, now abandoned; which is a division of application Ser. NO. 06/415,088, filed Sept. 7, 1982, now U.S. Pat. No. 4,511,432.

SUMMARY OF INVENTION

The objectives of this invention are to disclose and claim an improved liquid concentration procedure and its use, directed primarily to the use of dispersants, including selected anionic surfactants, in the downflow vertical tube evaporation by utilizing waste heat available at low temperatures to produce pure vapor having large specific volumes, or by utilizing vapor compression to drive the evaporation process, but being not limited thereto. These uses of selected dispersing surfactants include inhibition or control of scale-formation and fouling, and improved descaling and defouling of evaporators, to improve heat transfer, productivity or availability in liquid evaporation.

The disclosed process and preferred apparatus designs provide for improvements including the following separate but interdependent process functions: (1) improved evaporator feed distribution as a liquid-vapor-solid layer, (2) improved evaporation of liquid with improved thermal efficiency and with the simultaneous control of heat transfer surface fouling or scaling by the addition of a dispersant acting in conjunction with a solid phase precipitate, (3) improved separation of the product vapor from residual liquid phase, (4) improved dispersion and use of a solid precipitate within the liquid phase for the control of equipment fouling and scaling, and (5) improved occasional defouling or descaling, when needed, for instance by utilizing the dispersion or dissolution effects of a selected dispersing surfactant added to the liquid. The new process as applied herein is named Dispersed Seeded Slurry Evaporation, or DSSE; wider, liquid concentration use, including precipitation and heat transfer are applicable.

These improvements are combined herein, disclosed in a departure from conventional evaporator design and use, to provide for readily-automated scalefree operation and improved economy.

BACKGROUND ART, AND DISTINCTION OF THE INVENTION THEREFROM

Evaporation and concentration of liquids, and especially of saline waters, with the vertical tube foam evaporation (VTFE) method have been developed in recent years and patented: U.S. Pat. No. 3,846,254 on Interface Enhancement Applied to Evaporation of Liquids, also patented in Canada, Britain, Australia, South Africa and Israei. An improvement thereof was the subject of U.S. patent application Ser. No. 415,088 filed September 1982, issued as U.S. Pat. No. 4,511,432 on a method of feed distribution for the control of the upflow evaporation process, its stability and thermal performance. The present invention is applied to downflow evaporation as an example of dispersed seeded slurry evaporation (DSSE); DSSE is also applicable to upflow evaporation and other liquid concentration procedures.

The earlier VTFE process provided for the enhancement of the overall heat transfer coefficient (U) or the rate of evaporation by addition of a foaming agent (surfactant) to the liquid to be evaporated and by imposing foamy vapor-liquid-only layer flow over the heat transfer surface to improve evaporation in either the upflow or downflow modes of flow. VTFE enhancement depends on foamy two-phase flow; this enhancement is eliminated by the addition of an anti-foaming agent such as a silicon based foam breaker (Ref: Fong et al, Canadian Society for Chemical Engineering, Paper No. CSChE/CSME-75-Ht-1, 1975, page M7/8, or a commercial silicone suspension. The DSSE process however does not depend on foamy two-phase flow, is not eliminated by an anti-foaming agent addition, and is effective at liquid-solid, submerged interfaces where vapor or foam is remote.

In recent developments by others with brine evaporators used for the disposal of wastewaters, and relying on seeded slurry brine recycle for scale control, they have reported serious scaling even with the addition of the conventional scale inhibitors i.e. polyphosphates and polyacrylates; such scaling required frequent and costly interruptions for descaling. Such descaling has been needed on about a 3 to 6-month cycle, with chemicals or by hydroblasting the scale from evaporator surfaces, and has reduced evaporator productivity rates to about 60% of design capacity.

In the present invention for the concentration of liquids, the dispersant-dispersed seeded slurry evaporation (DSSE) process provides improvements by the addition of a dispersant or a dispersing agent (e.g. a surfactant selected for its dispersing effects) that inhibits scaling and fouling of equipment surfaces including submerged surfaces where vapor and foam are absent. Also, the preferred dispersant has been discovered to have the effect of improving the rate of descaling by causing redispersion and dissolution of such DSSE scale into pure liquid, or into non-saturated liquid. While such scales or deposits are inhibited with DSSE, they may yet eventually form on equipment surfaces but with incorporation of this dispersant therein. Descaling with a solvent is then assisted by the dispersant included in scales.

This DSSE process has been tested for its application to the concentration of industrial wastewater, a saline water or brine. The disposal of power plant cooling tower blowdown by many-fold concentration thereof during evaporation, utilizing waste heat, has thus been tested. It has been found that the DSSE brine concentration process operates with improved thermal efficiency due to scale-free operation for long (extended) periods of time. Also, that this scale-free operation is not negated by the addition of a commercial silicon based foam breaker or a silicone anti-foaming agent. DSSE scale control remained effective for evaporation tube surfaces as well as for submerged equipment surface sites that are free of vapor or foam contact. The DSSE dispersant agent is thereby distinguished from a VTFE foaming agent in its selection, its physical-chemical function, the site and the mode of its operation, and its use or application herein.

The DSSE additives are also distinguished from the conventional polymeric scale inhibitors above, as well as others proposed in the literature, by their basis for selection: DSSE dispersants are included in or incorporated with precipitates and scales and render them readily redispersed or redissolved in non-saturated liquid or in fresh water. Such selected dispersants include members of surfactant series that have a strong hydrophilic (or liquiphilic) group, are strongly polarized or negatively charged, or anionic, and monomeric when in dilute solution. Such selected dispersants may or may not cause foamy flow in a liquid evaporated by DSSE. A typical example of such a selected or preferred dispersant for DSSE is dodecylbenzene sulfonic acid or its salts. More effective DSSE additives of the alkylbenzene sulfonic acid type disclosed herein developed, found or selected later are understood as included under this disclosure, for DSSE uses.

THE DSSE PROCESS FOR CONCENTRATION OF LIQUIDS BY EVAPORATION

The objectives of this invention are to disclose and claim improvements in the evaporation of liquids by having a dispersant added, by imposing three-phase flow comprising the flow of liquid and solid and vapor, as a layer over a heated surface. The improvements of this DSSE procedure include providing evaporation of the liquid phase with long-term improved thermal efficiency and increased net distillate production (availability) or to reduce evaporator downtime. DSSE provides brine concentration with the precipitation of a solid phase maintained in a finely dispersed form by the addition of a dispersing agent, or a surfactant dispersant. This dispersant is effective in combination with the solid phase seed comprising the solutes that precipitate due to (or during) the evaporation, and to provide improved heat transfer, by the dispersion of precipitates in a saline slurry to prevent scaling as well as fouling of heat transfer surfaces. The dispersant additive is selected for the improvements of inhibiting scaling and fouling and for rendering scale or foulants with which it is associated or included readily redispersed or removed, for improved descaling or defouling DSSE equipment with non-saturated liquid or fresh water. The DSSE method also includes the combination with improved methods of feed distribution, vapor-liquid separation, and improved slurry maintenance for recycle thereof with improved rheology or pumping power. This combination system or process includes dispersant-dispersed seeded slurry evaporation (DSSE). It is disclosed with two modes of driving this evaporation system as follows:

(1) The vapor compression or VC-DSSE mode of operation whereby the vapor that is produced during the partial evaporation of brine (or liquid) is separated and compressed, to thereby cause this vapor to be elevated to a higher temperature and pressure (vapor pressure), and this compression-heated vapor is then caused to condense on one side (surface) of a heat transfer wall, such as an evaporation tube, while the brine passes (flows) over the other side (opposite surface) of the heat transfer wall during its evaporation. The heat of condensation of the compressed vapor is thus transmitted through the heat transfer wall (or tube wall) and into the brine flowing over the opposite surface of the wall (or evaporator tube) to thereby cause partial or further evaporation of the brine (or liquid).

Dependent upon the brine concentration factor, or the degree of evaporation or concentration applied thereto, and the concentrations and nature (e.g. solubilities) of salts, solutes, or any of the dissolved constituents of the brine, some or all of these solutes may partially precipitate (or crystallize) in a solid form and then become suspended in, and is dispersed into the remaining brine concentrate by the added dispersant surfactant being associated therewith, by adsorption, or by inclusion in the precipitate. This applies to the VC-DSSE mode, and also to the WH-DSSE mode below.

(2) The waste-heat or WH-DSSE mode of operation, whereby any other form of heating (rather than compressed vapor of the VC-DSSE mode) is used to drive the evaporation of the brine flowing through the evaporation tubes, especially whereby turbine exhaust steam (waste, or reject heat) or other heat or steam having only a minimal, or no $-value (e.g. vapor flashed from warm coolant water under vacuum) is used, or turbine extraction steam, or steam that is otherwise wasted or of lower value, or of lower temperatures than those of primary steam. In such use, as for example represented by FIG. 1, the evaporation is typically performed under full or partial vacuum conditions, or with air being excluded. Alternatively, primary steam may be utilized in a multiple-effect (ME) series of DSSE's operated in a series of temperature steps to maximize thermal economy, and the ME series may be topped by a VC-DSSE, in combination therewith.

WASTE-HEAT DRIVEN DSSE SYSTEM

In using power plant turbine exhaust steam for WH-DSSE, the brine-side of the evaporator, including the evaporation tubes and the vapor-side of the condenser, is at a deeper vacuum than the power plant condenser (or at a lower absolute pressure than the turbine exhaust steam pressure). As shown in FIG. 1, such a WH-DSSE system may comprise a downflow vertical tube evaporator, a condenser for converting the vapor produced into distillate, a vacuum pump to draw a vacuum on the DSSE system and to draw low-pressure steam from the turbine, and pumps and valves. Process control equipment for the fully automated, continuous operation of such a WH-DSSE system are advised for high economy. The DSSE system or procedure may of course be applied in other evaporators with similar benefits or improvements, including horizontal tube evaporators (HTE), upflow vertical tube evaporators (VTE), as well as vapor compression (VC) driven evaporators and with up-flow or down-flow of brine. Thus, any of the conventional evaporators such as HTE, VTE or VTFE facilities or plate type evaporators as well as brine heaters using either steam heating or the vapor compression drive mode may be improved by their operation with the DSSE method of scale control.

PRIOR ART, AND RECENT DEVELOPMENTS IN BRINE CONCENTRATION

In developments since April 1986, horizontal tube evaporators (HTE) have been in commercial use as brine concentrators, in addition to the earlier use of vertical tube evaporators (VTE) for this service. Scaling has been a serious problem with both HTE and VTE units in spite of the use of the conventional scale inhibiting additives including polyphosphates and polyacrylates.

Recent use of horizontal tube evaporators (HTE) in brine concentration utilizes the vapor compression drive mode (VC-HTE). Operated under vacuum, their evaporation temperatures range around 40° to 50°C. (100° to 120° F.); this includes the range used for DSSE operated with waste heat. The main precipitate at this low temperature range is typically gypsum, i.e. the dihydrate of calcium sulfate. Scale formation was reported in several such VC-HTE units; this required repetitive descaling, and imposed production losses as follows.

Scale formation in brine evaporators is indicated by a reduction in their overall heat transfer coefficient. Such reductions by about 50% have been reported within three months of the start of scaling in a VC-HTE, and, in a VC-VTE within three months of its complete descaling by hydroblasting. Descaling of VC-HTE facilities is usually done by treatment with solutions of ethylene diamine tetra acetic acid (EDTA) and sulfamic acid, recycled for hours at elevated temperatures. The vertical tubes in the VC-VTE units can be cleaned by EDTA, or by hydro-blasting the scale out, tube by tube while the unit is out of service. Descaling time required can be days to weeks. When this time loss is considered in combination with the reduction in distillate production rate during the typical, progressive scaling period, net distillation production rates (availability) of about 60% have been reported for both VC-VTE and VC-HTE units operated with the above conventional scale inhibiting agents. Such scaling in a VC-HTE unit operated with the seeded slurry method and having the required commercial polyphosfate scale inhibitor agent dosed to its saline feed water (at about 5 ppm), is indicated by the progressive reduction of the heat transfer coefficient during a 3-month period, from a range of 200 to 600 down to range of 100 to 300 Btu per hr-ft$^2$-° F. (Reference: Final Report prepared for California Department of Water Resources, dated August, 1986 on Field Test of a Vapor Compression Evaporator at the Demonstration Desalting Facility, Los Banos). Similar problems with scaling, and also requiring descaling with EDTA and sulfamic acid, in four other VC-HTE units used for cooling tower blowdown concentration, became known more recently.

The conventional VC-VTE typically operates near ambient pressures and at high temperatures (100° C.; 212° F.), and the main solute components precipitated are the anhydrous and the hemi-hydrate forms of calcium sulfate, with silica and magnesium hydroxide as minor constituents. Quite recently, in 1988, serious scaling was reported in a VC-VTE during seeded slurry brine concentration of a cooling tower blowdown feed having polyacrylates (40 mg/l) added thereto to inhibit this scaling. Descaling was needed, by treating a heat exchanger with EDTA and by hydroblasting the vertical tubes, about every 3 months during 1987, and the productivity rate (availability) of this VC-VTE was reported to have been about 57% of its design capacity through the year 1987.

No EDTA or sulfamic acid has been needed or used during many months of the tests to develop the DSSE method. Also, the WHDSSE has been found to have a higher availability than commercial brine concentrators. The DSSE has about a 90% availability and higher, subject to steam being available from the host site power plant, and its productivity rate is maintainable with a heat transfer coefficient at or above 1000 Btu per Hr-ft$^2$-' F., when it is occasionally rinsed out with freshwater only.

BRIEF DESCRIPTION OF THE DRAWINGS

FIG. 1 represents a flow diagram in simplified form of a waste-heat driven DSSE system, one of several procedures for using this invention. This system uses power plant turbine exhaust steam for WH-DSSE, and the brine-side of the evaporator, including the evaporation tubes and the vapor-side of the condenser, is at a deeper vacuum than the power plant condenser. As shown in FIG. 1, such a WH-DSSE system comprises a downflow vertical tube evaporator, a condenser for converting the vapor produced into distillate, and means to draw a vacuum on the DSSE system and to draw low pressure steam from the turbine.

FIG. 2 represent the preferred embodiment for evaporation of a liquid with waste heat by using the dispersed seeded slurry evaporation procedure of this invention, or by WH-DSSE. It is also useful in alternative modifications shown in FIGS. 1, 3 and 4. As shown in FIG. 2, this DSSE apparatus comprises a bundle of vertical evaporator tubes extending through a steam jacket mounted on a horizontal cylindrical vessel and having an inlet for turbine exhaust steam; vapor produced from the liquid is separated in the vessel from the residual liquid, and a condenser is mounted within the vessel to provide for condensation of the vapor into the distillate product.

FIG. 3 a, b and c show alternative design concepts of FIG. 2 whereby steam heat is used for evaporation in vertical tube bundles mounted centrally on horizontal cylindrical vessels, and herein separate condensers are located outside these vessels and connected thereto by vapor conduits, and whereby slowing-down of vapor flow rates as well as improved mist elimination are provided for.

FIGS. 4 a, b and c show concepts preferred for the vapor compression (VC) mode of liquid evaporation by the DSSE method, and whereby condensation of the compressed vapor occurs on the outside surfaces of the vertical tubes. In these alternative concepts for VC-DSSE the vessel design for high temperature operation is conventional (vertical cylindrical) as shown in FIG. 4a, while FIG. 4b provides for slowing down the vapor flow rates to improve vapor-liquid separation (as also in FIG. 3) and while FIG. 4c provides for an intermediate vapor slowdown and brine-vapor separation capacity.

FIG. 5 shows an alternative movable orifice plate for downflow DSSE feed distribution on to the inside walls of evaporator tubes as layers comprising vapor, solids and liquid, and to provide automation of the variation of the gap between the orifice plate and the upper tube sheet to thereby maximize the thermal performance of the process.

FIG. 6 shows an alternative fixed orifice plate of FIG. 2 in greater detail, providing a predetermined gap between the orifice plate and the tube sheet, and to form a pool of liquid or foam or slurry therein and means for improving the distribution of feed to all evaporator tubes.

PREFERRED MODE OF DSSE OPERATION:

To exemplify one preferred mode of DSSE use, FIG. 1 shows in its upper half, in diagrammatic form:

(a) A power plant boiler 83 supplying steam to a turbine 84 wherein it is expanded, and the exhaust or reject steam of low temperature (and under vacuum) is then usually drawn into an evacuated condenser 85 where it is cooled and condensed, by coolant pumped from a cooling tower 86 and returned thereto, and the condensate is then returned to the boiler with a pump, for its recycle as steam.

In addition, FIG. 1 shows, in its lower half, a WH-DSSE system connected to the power plant piping through an automated, fail-safe interface valve system including six WH-DSSE system isolation valves as shown:

(b) For brine concentration and evaporation, a side stream of the turbine exhaust steam is drawn under a vacuum through two steam valves 71 and 72 (being also two of the interface valve system), into the shell-side of the WH-DSSE tube bundle 77 (or into the tube-side of a HTE) for condensation, and to supply the heat of evaporation of brine slurry (or liquid) flowing as layers under vacuum over the opposite wall surfaces of these tubes, and the steam-side condensates are then returned to the boiler 83 in (a) through interface valve 73. Vapor produced by evaporation is separated from residual brine or liquid phase and flows into a condenser 78, maintained under high vacuum by a high vacuum line 87, where it condenses on water-cooled tubes fed by a coolant inlet line 88 and leaving by a coolant exit line 89, to produce the distillate 90 which is pumped out as shown. Cooling water flow into the water-cooled tubes is controlled by coolant supply valve 75 and coolant return valve 76, two of the six WH-DSSE system interface valves. The residual liquid or brine is recycled with a brine recycle pump 79 for further evaporation by DSSE in the tube bundle (or VTFE, VTE or HTE tubes) as a DSSE slurry, and its volume or level in the evaporator is maintained by the addition of feed liquid. This feed liquid may be cooling tower blowdown water through interface valve 74, and a dispersant surfactant is added through a valve 80, as shown in FIG. 1. This dispersant is to be added at a rate that is proportional to the feed flow rate, and at a dosing level sufficient to maintain an adequate dispersant level that maintains the distillation tubes in clean condition by its dispersant effects, and to control scaling or fouling (e.g. deposit formation or deposition on, or adherence to) equipment surfaces by the precipitate. These dispersant effects can maintain a high thermal efficiency for long (or prolonged) periods. The addition of the feed liquid is controlled by means of a liquid level controller [91] associated with the evaporator vessel that actuates a valve 81 allowing fresh feed to flow into the evacuated evaporator system to maintain a desired or constant residual liquid level in the vessel, as shown in FIG. 1. Also, blowdown brine concentrate 92 (liquid and solids phase) is rejected through a valve 82 from the recycled liquid to maintain a satisfactory concentration level in the recycled liquid phase, for instance by maintaining a constant (or a set maximum) brine concentration monitored by a conductivity controller or salinity monitor [93], as shown in FIG. 1. The automated, fail-safe interface valve system provides for the automatic isolation of the WH-DSSE system from the power plant system in the event of equipment or process failure.

Such a WH-DSSE system is readily maintained in continuous, automated operation, by maintaining an adequate (or full) vacuum by means of a vacuum pump connected at line 87, and by maintaining the flow of turbine exhaust steam to the system, condensing it to evaporate the brine recycled in the vertical tubes of a WH-DSSE (or VTE, or over the horizontal tubes of a HTE) and by condensing the vapor thus produced. This disposes of wastewater by converting 90% to 98% of it into pure distillate for recycle, or for other beneficial uses, and to reduce the wastewater into a highly concentrated brine blowdown residue of small volume, for disposal into a pond.

Alternatively this system may be used to generate a new water resource, for instance by using seawater as the feed liquid for a DSSE system operated in association with a coastal power plant.

In either VC-DSSE and WH-DSSE modes of operation above (cases 1 & 2), several aspects of design and modes of operation of the evaporator are of significance in order to maintain economical, troublefree operation thereof, and are provided for as follows.

Improvements provided by the DSSE method include fouling control and scale control on equipment surfaces and heat transfer surfaces. Inhibition of fouling and scaling are understood to be provided for by the well-dispersed (powdery when dry) precipitates observed with DSSE, in part by an enlarged surface area for preferential further precipitation on to precipitates rather than on to equipment surfaces, and in part by the precipitates having a charge (polarity) imposed thereon or imparted thereto due to adsorption thereon and/or inclusion of the dispersant therein, i.e. incorporation therewith, that is alike to the charge of the dispersant layer adsorbed on or associated with equipment surfaces. This is understood to provide for their mutual repulsion, for strong dispersion effects, and to provide, in part, for effective DSSE scale control effects as observed during tests. Also provided by DSSE operation are the clean equipment surfaces as observed, and without evidence of fouling initiated corrosion. Also, the absence of settling (dropout) of precipitates from the brine-and-solids slurry within the evaporator vessel, or clay formations, or stickiness was observed during adequate dispersant dosing. Also provided for by DSSE design are continuous and satisfactory brine distribution such as to evenly and adequately distribute brine or brine-and-solids slurry to all the evaporation surfaces (tubes), maintenance of an adequate solids content of a well-dispersed seeded slurry to provide an adequate seed surface area to accommodate new precipitates from the evaporating brine to be deposited within the liquid phase or onto this seed slurry rather than to adhere to or deposit on to the heat transfer surfaces (tube wall surfaces) or vessel walls. Also provided for are a steady temperature of evaporation, adequate de-aeration to degas the feed liquid for the evaporator, maintenance of an adequate concentration of dispersant in the partially evaporated slurry (brine-and-solids slurry) to ensure an adequate dispersion of the precipitated solids phase within the liquid brine phase and an improved heat transfer performance or thermal efficiency of the evaporation process. All of these are objectives of this invention. The evaporator designs and the methods of DSSE operation disclosed in this invention have as objectives to improve or ensure or promote reliable, prolonged, and economical evaporation and brine concentration, with reduced downtime.

Dispersant-dispersed seeded slurry evaporation (DSSE), the main subject process of this invention, comprises evaporation from a flowing, vapor-liquid-solid seeded slurry with improved thermal efficiency provided by the prevention of scaling and fouling of system surfaces for long periods, and the DSSE also provides a new procedure for occasional descaling or defouling when needed.

Two mechanisms are believed to be provided, with DSSE:

(1) The dispersant effect, whereby the selected dispersant additive associates with the seed precipitate during its deposit formation or deposition or precipitation by adsorption, inclusion, or incorporation, as monomers or as micelles or as layers to keep the seed slurry particles from agglomerating or caking or touching, and thus more seed surface area is exposed or free for the deposition of solutes thereon in greater preference to deposition on to tube and metal surfaces than with an equal mass of seeds without the selected dispersant additive. In addition, part of the dispersant additive associates as a monolayer (or as a thin film) over the metal surfaces and, by common charge effects, hinder the approach of the seed or slurry particles and their adherence to the surfactant-coated metal surfaces to further control and prevent evaporator scaling or fouling.

(2) The redispersion effect, whereby the dispersant which is associated with the seed precipitate as in (1) facilitates the redispersion of the seed or scale particle by drawing in liquid or water with or via its strongly liquiphilic or hydrophilic group, and thus provides the observed improved descaling mechanism observed and its reduced descaling time.

The mechanism of incorporation of dispersant with seed and deposit, and its reactivity when so associated are not fully understood or known. However, observations made during the DSSE development tests lead to conclusions or postulations as follows:

1. It was observed that the DSSE precipitate tended to adhere to equipment surfaces only after dispersant dosing ceased or was reduced to low and inadequate levels during DSSE operation. Continuous, adequate dosing of dispersant kept seed slurry particles from caking or clay formation, and to be fully dispersed, non-sticky, suspended in the liquid as fine, particulates (as a powder when air-dry). Also, it was observed that such air-dried precipitates are readily redispersed by covering it with water and stirring.

These observations lead to the conclusion that in DSSE, more seed surface area per unit mass of precipitate is exposed, or free, for the precipitation of solutes thereon than in the absence of dispersant. Also, in preference to scaling (plating out or deposition on or precipitation on tube and metal surfaces) precipitation occurs exclusively on to seeds provided that these seeds are fully dispersed by adequate dispersant dosing. Also, the surfactant coats or associates as a monolayer (or as a thin film) over the metal surfaces, as understood, by an affinity between the metal surface and the hydrophobic (or liquiphobic) group of the dispersant, and its incorporation into the seed or slurry particles hinders their approach to and adherence to both one-another and to the surfactant-coated metal surfaces, by the strong, negative common charge effect due the anionic group, and to further inhibit, control and prevent scaling or fouling of the metal surfaces by deflecting or repelling particulates.

2. Tests for dispersant added earlier to the feed liquid showed that most of the additive ends up adsorbed on or included in, or enclosed in, or incorporated with the seeds discharged with the blowdown brine. These additives can be recovered from these seeds by redispersing and dissolving them in fresh liquid. Also, a portion of the additives adhere to the equipment walls and can be washed off, only by repeated rinsing, in diminishing amounts. And a third portion of the additives can be detected in the liquid phase (in solution). It was also observed that the relative distribution of the three portions or parts of the additive among these three sites vary, and increased in the brine phase with increasing brine temperatures.

This leads to the conclusion that the selected surfactant is in part adsorbed by the precipitates formed and in part is included within the precipitated seeds or incorporated with the precipitated particles or seeds suspended in the brine concentrate. Such incorporation may be by adsorption, by hydrogen bonding, by association with water of hydration (e.g. in gypsum), or as mono-layers on some surfaces, or by inclusion, or by being enveloped during the precipitation, for instance as small globules or micelles of the dispersant (surfactant). It is concluded that this incorporation of DSSE dispersant surfactant occurs with both the precipitate remaining dispersed in the brine and with any scale or foulant that may deposit on to heat transfer surfaces and other equipment surfaces, forming relatively soft, hydrated or amorphous precipitates and deposits, which are readily redispersable in water (or liquid).

These concluded (postulated) incorporations of the added surfactant is supported by the fact that only a small proportion of the additives can be analyzed as present in the clear brine phase, and some adhere to the equipment surfaces, associated therewith, as understood, via their hydrophobic (or liquiphobic) group or long hydrocarbon chain (as indicated by the fact that about 20 hot rinses with water are required to remove the dispersant from the evaporator), and that the slurried solids phase, after being separated and washed with water and dried in the air shows strong dispersant (surfactant) releases when it is redispersed in water even after being stored for an extended period, up to several months. This inclusion of surfactant dispersant is believed to be a major factor rendering the scale or foulants, that may eventually accumulate on the equipment or heat transfer surfaces in DSSE, to be readily removed (or descaled) or redispersed with a fresh water wash in about 24 hours. In contrast, the descaling of commercial brine concentrators require extensive and tedious chemical treatments or hydroblasting, often required to be repeated on a three-month cycle, and may only provide for 60% of their design availability.

It was found that the "adequate" DSSE dispersant dosing level needed for a non-sticky precipitate and for scale prevention vary with the seed concentration precipitated from the wastewater feed used. For instance, while a dosing rate of 10 mg/1 of dodecylbenzene sulfonic acid was adequate for a feed (cooling tower blowdown) which produced about 5% of solids (slurried seed) in its 10-fold concentrated brine, another cooling tower blowdown feed which produced about 9% of solid seeds at its 10-fold concentration required a dosing rate of about 15 mg/1 of this additive. An experimental procedure of determination of the "adequate" dosing rate, as well as the selection of a dispersant most effective for a given liquid composition, is thus preferred.

The effects of the selected DSSE surfactant to improve the rate of dispersion and dissolution of scale formed and of foulants are readily reproduced, but are presently not fully understood.

DSSE dispersants presently selected for cooling tower blowdown concentration include anionic surfactants, particularly those with a strongly negatively charged hydrophilic (or liquiphilic) group such as sulfonic acid, and including linear alkylbenzene sulfonic acids (LAS) such as dodecylbenzene sulfonic acid, or their salts. These dispersants have been found to be effective to inhibit scaling in brine concentration, and to prevent the reduction in evaporation rates experienced in conventional brine concentrators, and to permit continuous DSSE operation with only an occasional washing with freshwater to maintain prolonged, and almost indefinite evaporator operation at or near its design capacity, subject to steam availability at a sufficient temperature. Also, it has been found that these DSSE dispersant effects were not adversely affected by the further occasional addition of an anti-foaming agent to eliminate troublesome foam conditions occasionally encountered due to vacuum leaks. Such anti-foam agents included commercial silicon based anti-foaming agents or silicone oil suspensions in water.

The DSSE use of monomeric anionic surfactants, such as dodecylbenzene sulfonic acid, and their effects on redispersion and dissolution of deposits or scale incorporating them, distinguish DSSE over the prior art including evaporation relying on induced foamy flow (VTFE) with added foaming agent surfactants (Sephton, U.S. Pat. No. 3,846,254) and the method for preventing scale in seawater evaporators by the use of positively charged nonionic and cationic surfactants (Hirota et al., U.S. Pat. No. 3,932,224), as well as polyacrylate or polyphosfate additives.

The amount of dispersant (dodecylbenzene sulfonic acid) added has typically been varied between about 5 and 25 parts per million parts of cooling tower blowdown (wastewater) feed for the DSSE facility, which was then concentrated by a factor of about 10 at a pH of 7 to 9 and with the precipitation of about 3 to 9 parts of solid solutes (or salts) to brine concentrate, as a slurry including gypsum, magnesium hydroxide, and silica. However the adequate dosing rate may be much lower in cases where the precipitation rate is very low, as with seawater feed, and it may be somewhat higher in cases with highly concentrated feeds. The broad range of DSSE dosing requirements is anticipated to be between about 3 mg/l of feed and 100 mg/l of feed (ppm of feed). Generally, the DSSE heat transfer rate was maintained at or above 1000 Btu/hr-ft$^2$-° F. when the available turbine reject steam was at or above 115° F. and the power plant MWe demand was near its design capacity so as to provide an adequate temperature difference between the steam and the brine temperatures of DSSE of about 6° F. or higher.

The DSSE process allows the use of terminal (low temperature) turbine exhaust steam as being sufficient for the evaporation and concentration of cooling tower blowdown for its disposal in an economical manner, because of its maintenance of clean surfaces that reduces the thermal driving force or temperature difference (delta T) conventionally required for brine evaporation, and it provides for long-term, high DSSE thermal efficiency.

In the combination sketched in FIG. 1 the WH-DSSE process utilizes the delta T available at a power plant for the terminal rejection of waste heat to the atmosphere through a cooling tower. In such use, the WH-DSSE provides an additional condensing surface area (in addition to that of the power plant condenser) for the rejection of heat. This can reduce the pressure in the power plant condenser sufficiently to improve the power plant heat rate (measured in Btu of fuel used per MWe power produced), and this provides the basis for a significant credit when a WH-DSSE is retro-fitted to a pre-existing power plant. In such an application, the waste heat used not only has no $-value (is free of cost) but the WH-DSSE earns a credit by providing a cost reduction on the power generation costs. Depending upon the relative sizes or capacities of the WH-DSSE facility and the steam turbine it is added on to, this reduction in annual cost of fuel due to WH-DSSE can offset a significant part of the cost of the WH-DSSE facility when applied over the (25 years) life of these facilities. The WH-DSSE can be readily automated, primarily because of its simplicity of operation, and the low temperature of its operation. When occasional descaling or defouling is required, this is facilitated by the observed effect of the added dispersant of DSSE to increase the dispersion and dissolution rates of the soft gypsum scale deposits formed at these low temperatures, and with dispersant incorporated therein. As a result of the almost scalefree operation of the DSSE coupled with the easy and quick occasional descaling thereof, the DSSE has an availability of about 90% or higher. This is the most significant improvement of DSSE, and it compares very well with the typical availability of about 60% for some present conventional brine concentrators that require frequent descaling, usually at intervals of three months; and requiring time for hydroblasting or extensive and repetitive chemical treatment of their heat transfer surfaces, followed by a relatively rapid resumption of progressive scaling.

However, one of the inherent disadvantages of WH-DSSE operating with terminal temperature steam, i.e. turbine exhaust steam, is the low density, or high specific volume, of the product vapor due to the high vacuum (or low absolute pressure and low temperature) of operation. This requires that relatively large, evacuable (and vacuum-tight) vessels and ducts be used to transfer steam and vapor at sufficiently slow linear velocities to keep vapor pressure drops low and, especially, to provide a sufficiently slow flow of vapor through mist elimination pads for the effective removal of brine droplets from the vapor before it is condensed, to produce adequately desalinated distillate. Such large vessels may impose disadvantages in terms of the size limitations for rail or road transportation required by large evaporation plants, i.e. of distillate capacities in excess of 100,000 gallons per day.

DESIGN ASPECTS, AND SEVERAL APPLICATIONS OF FSSE:

In conventional designs for VTFE and VTE the liquid-vapor disengagement vessel is of vertical cylindrical design and concentric with a vertical cylindrical tube bundle associated therewith and ejecting the product vapor and residual brine vertically there-into in upflow or downflow directions.

This invention includes the disclosure of an improved evaporator concept and its use, directed primarily towards downflow WH-DSSE i.e. low-temperature evaporation and high specific vapor volume applications. Design flexibility is provided to accommodate several combinations of interdependent process aspects, applied to the downflow WH-DSSE and VC-DSSE modes but understood to have broader applications.

The benefits of the DSSE method applied to the vapor compression vertical tube evaporation process (VC-VTE) or other VC-processes including horizontal tube evaporation (VC-HTE) are in part similar to those of the above waste heat (WH) applications but not quite as economical. The VC-DSSE method still provides improved thermal efficiency for the evaporation process by maintaining the evaporation rate (or evaporator capacity) to thereby improve availability. The enhanced thermal efficiency of the VC-DSSE may be utilized entirely in terms of a capital cost reduction of the evaporator by reducing the size and cost of the evaporator, or by optimizing overall economy by a combination of capital and operation-and-maintenance costs. In either case, the WH-DSSE is more economical than the VC-DSSE but cannot always be accommodated physically near to a turbine or other waste heat source, or this source may not be continuously available or adequate. In such cases the VC-DSSE could be the best option.

Alternative sources of waste heat can be used for WH-DSSE, notably waste heat available in a warmed coolant stream from a power plant condenser. This heat source may, for instance, be utilized by flashdown under vacuum of such warmed water to produce steam (vapor) of a sufficient temperature for WH-DSSE use. An added benefit and economy of using this source of waste heat is that the condensate from this flashed vapor becomes additional product to be added to the distillate produced by the DSSE at a lower temperature. Yet another source of waste heat suitable to drive a WH-DSSE is to operate it in combination with a solar pond. The enhanced reliability and thermal efficiency of DSSE at low temperatures of evaporation provide for the desalination of solar pond brine (or other saline waters) to produce useful distilled water and also to maintain the salt gradient of such a pond. In this application the WH-DSSE may use as feed a natural saline water, and utilize flashed vapor from the solar pond brine to provide the waste heat, and to produce fresh water and to also produce a highly concentrated seed-slurry brine. From the latter, the salt required by the solar pond can then be obtained by removing the solid (seed) salt, e.g. by sedimentation or filtration (or by foam flotation), and then using the clear saline water concentrate product in the solar pond. To maintain an adequate salt gradient in the solar pond and/or to offset the natural tendency of the salt gradient to be reduced due to for instance, diffusion, a saline feed may be withdrawn from the pond at a selected level of temperature and salinity, flashed down partially under vacuum to produce steam (vapor) of adequate temperature and flowrate to provide the waste heat for the DSSE, and another (or the same) saline feed withdrawn at a selected level from the pond may be concentrated in the WH-DSSE to obtain a concentrated product of sufficient salinity to be reinjected into the bottom, highly saline layer of the pond after removal of dispersant or surfactant and particulates. A portion of the salt may be harvested from this DSSE concentrate (e.g. by crystallization of sodium sulfate) to remove a useful product for exportation from the solar pond. The desalinated products (condensate from flashed vapor and/or distillate from the DSSE) may be returned to the top liquid layer of the pond to assist in the maintenance of the saline gradient. In this manner the WH-DSSE (or a WH-VTFE) can be utilized to maintain the desired saline gradient of a stratified saline solar pond and could also be used to produce harvested salts and/or distilled water for beneficial uses.

PREFERRED DESIGN FOR THE WH-DSSE AND ITS USE

The preferred design shown as best suited for WH-DSSE use, can also be used advantageously for low temperature, seeded slurry VC-DSSE and VC-HTE as well as for non-seeded WH-VTFE and VC-VTFE and for low-temperature, non-foamy VC-VTE and WH-VTE uses. The preferred embodiment of the WH-DSSE of this disclosure is shown in FIG. 2, applicable also for alternative modifications shown in FIGS. 1, 3 and 4, and typical aspects of DSSE designs and of the DSSE process and their use are as follows:

Referring to FIG. 2, this DSSE apparatus comprises a vertical evaporation tube 1 preferably as one of a parallel multiple tube bundle comprising, in this DSSE of 199 such commercial double-fluted aluminum-brass tubes of 3-inch diameter, 10-ft long extending through a steam shell or steam jacket 2 having a flanged steam inlet 3 thereto, though which steam from a turbine exhaust is fed, and secured with an upper tube sheet 4 and a lower tube sheet 5 each of substantially the same horizontal dimensions as the steam shell 2 it is sealed to. The vertical evaporation tube upper ends 6 are spaced from a distributor plate 7 by a gap that may be variable to control and ensure an adequate and about an even distribution of liquid, vapor and dispersed solids to the upper ends of said evaporation tube bundle to provide for a maximal evaporation rate with enhanced thermal efficiency, similar to the feed distribution control designed for the upflow VTFE in U.S. Pat. No. 4,511,432. Said orifice plate having orifices 8 or holes therethrough and at locations with reference to said tube upper ends 7 and of dimensions selected to thereby in combination provide an adequate and suitable flow of liquid therethrough and to assist (with said gap) in the suitable distribution of adequate feed liquid flow to said tubes 1. In the preferred embodiment said orifices 8 are interstitial of the tube locations so as to project the liquid feed to impinge upon or to be directed towards (or against) the upper tube sheet surfaces between the tubes extending therethrough, or being fixed flush therewith. Said orifice plate 7 being located intermediate of a liquid feed inlet 9 and the tube bundle 1 upper ends 6. Said vertical tube 1 lower ends may be flush with the lower surface of the lower tube sheet 5 or extend therethrough by several inches in a fixed position by, for instance, expanding and sealing each tube by a tube rolling operation, and the upper tube ends may be sealed flush with the upper surface of the upper tube sheet, or may preferably extend through and above this tube sheet surface (as shown) by about one inch. This extension can range between less than one inch to several inches in length for purposes herein described. The size of the gap, and the extended length of the tubes above the upper tube sheet can be adjusted to provide the preferred annular seeded flow distribution, dependent upon the operating temperature, and the nature of the liquid including its viscosity, foamability and solids content, and the feed flow rate, degree of flashdown, etc. such that sufficient mixing of the solid, liquid and vapor phases is created by the jets of feed squirted into the pool of liquid to provide the desired mixed annular overflow into the evaporation tubes. This feed distribution system is typically designed on a case by case basis to provide the preferred composition of a mixed vapor-liquid-solid flow directed on to the tube inner wall at or near its inlet end in a continuous annular layer flow. Said tube bundle 1 having open-ended lower tube ends 10, a condensate removing conduit 11 associated therewith, for instance through said lower tube sheet 5, and means for removing noncondensable gas from the steamside 12 thereof, for instance a central, vertical vent control tube 13 being closed at its top end, open ended at its lower end and having a multiplicity of small holes drilled through the wall thereof along substantially its length exposed to said steam-side 12, and at locations and of sizes (diameters) selected to ensure flow of gas (steam, vapors or mixtures thereof) from the steam-side under all normal conditions of operation of the evaporator, but to also limit excessive (or wasteful) flow of steam into the brine side at 14.

Said steam shell can be provided with a flange 15 or other jointing whereby to attach it removably to the evaporator vessel 16, or it may be field welded or sealed to said vessel 16 as shown at 17. Said flanged attachment 15, or alternative field welded attachment, as the preference may be, provides for, and adds to the advantages of the subject design to provide that the DSSE apparatus can be shop-fabricated in large segments that promotes economy and transportability, and subsequently for easy field assembly and support thereof for plants of large evaporation capacity when operating at low evaporation temperatures. This concept of a detachable or separately optimized horizontal disengagement vessel and a detachable or separately optimized evaporator bundle increase the design flexibility, and the optimization of such functional areas (i.e. the flow cross sections thereof) to provide shipping size and cost advantages for plants of higher capacity, and to reduce manufacturing costs by permitting convenient shop fabrication of large segments and permit later field assembly of components. The addition of a skirt 18, attached at the lower end of said steam shell can provide a brine splash barrier for impingement of droplets and to channel the flow from said tube bundle downward and to aid vapor separation from the residual liquid phase.

The vapor liquid separation vessel or evaporator vessel 16 comprises a generally cylindrical horizontal body having rounded end caps or spherical or torispherical domes 19, to provide an adequate volume to slow vapor flow rates sufficiently to promote dropout of brine or liquid phase, and to reduce the vapor flow rate through mist elimination pads 20 supported therewithin to allow removal of virtually all liquid droplets from the vapor, and to provide such vessels 16 at an economical or low cost and sufficiently rigid to withstand the atmospheric pressure when evaporation occurs under full vacuum. Said cylindrical horizontal body design providing a departure from conventional vertical cylindrical VTE vessel design and providing a much increased freedom of design to accommodate and slow down the much larger vapor volumes generated at low temperature, waste-heat evaporation for large-capacity installations. Such increased freedom in vessel design provides for independence in designing vapor-liquid separation and mist elimination from the design of an adequate evaporation tube bundle to generate the vapor. This uncoupling of these two functions is of particular significance for waste-heat DSSE operation at the low temperatures now made economically available by the high heat transfer performance of DSSE. Thus the vapors generated and flowing with the residual liquid from the tube bundle 1 separates partially therebelow, and the vapors with brine droplets entrained therein flow out horizontally into the cylindrical vessel, slowed down much by the much larger cross sectional area for horizontal flow than for the downflow area provided by conventional VTE designs. Such vapor slowdown provides for further dropout of liquid droplets from the vapor flow, especially towards the farther end of the horizontal vessel as the vapor passes upward through the mist elimination screens located across its path of flow. Such screens typically comprise stainless steel wire mesh and/or louvered plates or impingement surfaces 20. Cleaning of mist elimination screens and droplet impingement surfaces to remove particulate matter and brine is provided for by projecting the incoming feed into the evaporator vessel against those surfaces and into the mist elimination screens as shown, with spray nozzles and the like 21. This feed spraying into an evacuated vessel can be sufficient to also deaerate it or to remove noncondensable or gaseous constituents, such as carbon dioxide therefrom, and to have such gases, as well as those vented at 14 through the vent tube 13 removed from the evaporator by means of a vacuum pump, through an evacuation pipe 22, which also maintains the entire DSSE unit under vacuum.

The separation of the three functional areas needed for vapor formation, vapor separation from residual liquid phase, and seed slurry maintenance increases design flexibility and reduces costs. This is especially significant for the low temperature of operation made possible by the high thermal efficiency of DSSE. This design approach also provides that the condenser tube bundle can be incorporated into the vessel 16 as shown in FIG. 2, to save the cost of a separate condenser vessel. The residual liquid passing through evaporator tubes 1 in the evaporation tube bundle falls down from the lower tube ends 10 whence it typically emits as annular layers of brine slurry, falling downward under gravity and coalescing into larger liquid globules. It has been found useful to have these coalesced globules impinge upon adjustably slanted plates or vanes 50 set at about a 45 degree angle above and free surface of the liquid layer maintained in the bottom of the evaporator vessel so as to impart a horizontal momentum thereto, setting up and maintaining a vortex flow, or an elongated circular (stretched vortex type) flow in the residual liquid layer in the bottom of the vessel 16. Such vortex or circulatory flow has been found adequate to maintain turbulence in the residual liquid sufficient to maintain the slurried seed in suspension in the residual liquid and to prevent seed drop-out in the evaporator vessel, without the need for any energy besides this gravity-induced flow. Seed drop-out prevention is important mainly for two reasons: (1) A minimum DSSE seed suspension of about 3% may be needed to assure that the entire precipitation of solutes during evaporation in the tubes 1 occur on to the seed surfaces and not on to the tube surfaces and, (2) dropout of seed could cause large accumulations of solids in the evaporator vessel 16, causing shutdown or unsteady operation. Good mixing of liquid and solid phases into a fairly homogeneous well-dispersed slurry promotes scale-free, trouble-free steady-state operation, and also reduces brine recirculation pump costs. A central vertical flat plate 23 can be provided, fixed along the inner bottom of the elongated cylindrical vessel 16, extending for most of the cylindrical section to separate the straight opposite flows of circulated liquid, but leaving the rounded end cap areas free for turn-around areas for the circulated liquid-slurry flowing in an elongated vortex within the vessel 16.

The vapor, after passing through the mist elimination screens 20 can be condensed on water-cooled condenser tubes 24 shown here as a horizontal U-tube bundle 24 condenser located within the evaporator vessel 16, and having a condensate (or distillate) drip tray 25 therebeneath to collect the distillate for removal thereof through conduit 26. The condenser bundle is integral with a flanged tube sheet 27 and, as shown is removably installed through matching flanged connecting means 28 attached to the end dome of the vessel 16. This saves the cost of a separate evacuable condenser vessel but requires that an adequate space be available within the vessel 16; this is provided for by this horizontal vessel design approach, as shown. An alternative condenser design would provide a separate condenser vessel and provide an outlet for vapor such as flanged connecting means 28 whereto the separate condenser vessel such as shown in FIGS. 1 and 3 would be connected through a vapor conduit. Coolant inlet 29 and outlet 30 conduits are shown in FIG. 2 to provide for coolant flow through the condenser tube bundle 24. Additional feed inlet and distribution means can be provided, similar to those shown 21, but for the purpose of periodic (or continuous) washing of various internal vessel 16 areas to remove deposits due to impingement and evaporation of brine droplets. This includes the provision of several alternative feed inlet conduits with automatic valves that permit the time-scheduled switching of feed flow so as to deliver the feed periodically at different locations for the purpose of washing down deposited salts, including salts and brine accumulating in the mist elimination screens and condenser tubes. Such a feed delivery conduit system and feed spray means are also to be provided specifically for the purpose of breaking foam accumulations within the vessel 16 and to prevent it from reaching the mist elimination screens. Such a prevention mechanism can also include a sensor for foam build-up, including photocells or contact sensors to automatically activate this feed spray system whenever excessive foaminess occurs anywhere within vessel 16, and utilize the entire feed stream for foam breakup at such times. In addition, under severe foaminess conditions such as when an air leakage into the evaporator occurs, an automatic anti-foam dosing means may be triggered for anti-foam delivery in admixture with the feed stream or with a part thereof, until the air leakage can be corrected to eliminate the excessive foaminess.

A selected dispersant (or a surfactant/dispersant) 33a is dosed into the recalculated brine e.g. at a position upstream of the brine recycle pump 33b, through a valve 33 as shown in FIG. 2 (or elsewhere) at a rate of flow within the range that will provide an adequate residual (free) dispersant in the brine to ensure that all precipitates are well dispersed. A typical dispersant dosing rate has been found to be within the range of 5 to 25 mg/1 of feed flow rate for cooling tower blowdown feed evaporated 10-fold by DSSE.

One of the advantages of the dispersant additive is its effect that helps to prevent adherence to or deposition, precipitation or crystallization of solids on to the tube and vessel walls; this is in part due to the dispersant molecules migrating to the liquid-solid interface (coating or mono-layering) over the tube and vessel wall surfaces to form a very thin layer or skin of dispersant molecules aligned with their hydrophobic group (or hydrocarbon part of these molecules) toward the wall and with their hydrophilic groups associated with water. A similar but weaker skin or envelope of surfactant molecules may form, adsorbed around particles of precipitated solutes or being incorporated therein, repelling or deflecting such particles away from the film on the tube and vessel walls due to the fact they are then charged alike or the same as the film on those walls, and understood to both be negative for the preferred dispersant. This side effect of the surfactant additive provides a second (dispersant) mechanism, in addition to the seed-slurry mechanism that provides a familiar surface for precipitation. The well-dispersed, small-sized seeds of DSSE precipitate provides increased surfaces and an improved mechanism that prevents or inhibits fouling and scaling of the vessel and tube surfaces. As a consequence, it was found that scale-free DSSE operation is maintainable with 3 to 5% of seed while, typically, higher seed concentrations (about 10%) are preferred in conventional seeded-slurry VTE (wherein dispersant added for DSSE is absent). Additionally, with DSSE the tubes and vessels remain cleaner of fouling or scaling materials, and occasional cleaning thereof is facilitated by the presence of dispersant in foulants and scalants.

A slurry supply vessel or holding tank can be provided as part of or associated with the main vessel, or connected therewith by conduit means, or for instance an open-topped metal or fiberglass reinforced polyester tank as shown 31, to hold in storage a sufficient volume of brine and precipitated seed slurry to serve as (or to provide for) a recharge volume of recycled brine-slurry in the event of first startup of this evaporation process or, to replace any brine slurry lost due for instance to process control problems, and also to store the recycled brine slurry during occasional needs to empty the vessel 16 or to descale the evaporator tube bundle or to clean out the evaporator system. For instance, a periodic cleanout of the evaporator should be scheduled as normal procedure, and this could be initiated by diverting the normally recycled brine slurry into the supply tank 31 through valve 34a, followed by recycling non-saturated service water or freshwater (or other cleaning liquids) through the evaporator (with or without continued evaporation for maintaining production of distillate) until this system is once more cleaned of scale or foulants, and then to blow down the rinse water and resume normal operation after recharging the brine slurry from the supply or storage vessel 31 into the DSSE system. This is done by first stirring up the contents of the tank 31 by means of the stirrer 32, followed by opening a valve 34b to the brine recirculation pump shown and allowing the mixed slurry to be drawn into the lower, or brine area of the vessel 19 under vacuum, and then closing valve 34b (before air is drawn in) and starting the brine recycle pump.

One of the major advantages of WH-DSSE is that a relatively soluble precipitate (a powder when dried) including gypsum, rather than the more insoluble dehydrated forms of calcium sulfate, is formed at these low waste-heat temperatures, facilitating the otherwise slow descaling required that includes hot chemical recycle for descaling of those hard scales. Typically, the dehydrated scales that form in high-temperature VC-VTE brine concentrators, as well as gypsum scales that form in low-temperature VC-HTE units recently introduced commercially, require hours of chemical treatment (i.e. with EDTA at elevated temperatures) to descale such non-DSSE evaporators.

As a further advantage of the waste-heat mode of WH-DSSE disclosed herein, using turbine exhaust steam, the entire operation can be automated for non-stop distillation to occur even during descaling, facilitated by the soft gypsum precipitated with dispersant additives and WH-DSSE operating conditions. Regarding process control, the most significant controls to be provided for are steam flow control, adequate brine slurry recirculation, adequate brine-slurry level in the evaporator vessel 19 that can be controlled by a level controller 35 which maintains adequate feed flow, and brine and slurry concentration control by for instance a flow-through conductivity monitor 36 which controls the DSSE blowdown, surfactant/dispersant dosing upstream of the brine recycle pump, through valve 33 as shown in FIG. 2, and at a rate that is proportional to the feed flow rate and at a dosing level that is adequate to maintain any precipitates (or seed slurry that occur) in the brine in a fully dispersed and non-sticky state, maintenance of an adequate (or full) vacuum, and adequate coolant flow. All of these DSSE process needs are satisfactorily provided for by conventional process control equipment and instrumentation which actuates pumps and valves responsive to the vital process parameters including liquid flow, temperature and salinity.

TYPICAL OPERATION OF PREFERRED WH-DSSE UNIT

The evaporator system as shown in FIG. 2 is evacuated of air with a vacuum pump connected to conduit 22, checked for significant air leaks by a vacuum decay test and any such leakage eliminated. In the meantime, the stirrer in the slurry tank 31 is activated to fully mix (disperse) the blowdown slurry seed collected from an earlier DSSE operation. Alternatively, a new startup seed slurry may be prepared by filling the slurry tank with water, adding about 10% sodium sulfate (dehydrated), and about 5% sodium chloride thereto, dissolving these by stirring, and followed by the slow addition with continued stirring of a concentrated solution of calcium chloride in water sufficient to provide about a 5% precipitate of (gypsum) or particles of any scale-forming species dissolved in a wastewater feed for (DSSE) in the slurry tank 31. The fully mixed seed slurry solution is then drawn into the evaporator under vacuum through valve 34b, the brine recycle pump 33b is turned on to recirculate the seed slurry for downflow through the evaporator tubes (1) of which there are a multiplicity in this tube bundle, and the dispersant (dodecylbenzene sulfonic acid) is then added to a total concentration of about 50 mg/l of the volume of the start-up seed slurry only. No dispersant addition is needed for start-up with a recycled brine slurry. An anti-foam agent (e.g. silicone) may be added to control excessive foaminess during the evacuation of air from the seed slurry. It should be observed that the seeds added remain well-dispersed in the recycled brine by an adequate flow rate in the elongated vortex flow imposed in the brine pool in the evaporator vessel, by adjusting the deflection angle of the slanted vanes 50 for deflecting the brine cascading from the evaporator tubes and impinging on these vanes 50. Cooling tower blowdown may then be added as feed, subject to the brine level as sensed and controlled by the level controller 35. through the valved line shown on its right next to it, in FIG. 2. The steam valves and their controls, for the automatic steam flow control may be activated, to permit turbine exhaust steam (WH) to flow into the shellside 12 of the evacuated evaporator tube bundle for condensation thereon. Heat of condensation of this steam should soon warm the brine slurry to its evaporation temperature within the tubes, and to generate vapor. The coolant flow through the DSSE condenser may then be started, to maintain continuous evaporation, and condensation of the vapor produced. The product distillate 26a, obtained from the condensing vapor, is pumped out as shown through conduit 26, and is available for use after it has reached a satisfactory purity as indicated by its conductivity. The steam-side condensate is allowed to flow under gravity from conduit 11 into the evacuated deepwell of the power plant turbine-condenser system, for recycle to the boiler. Dispersant is dosed into the recycled brine upstream of the brine recycle pump 33b as shown in FIG. 2 by using an automatic dosing pump actuated by a signal from a feed flow-rate monitor, and the dosing pump stroke is set to deliver about 20 mg/l based on the feed liquid in-flow rate (cooling tower blowdown feed). This initial, overdosed rate of dispersant can later be reduced experimentally to a level slightly above the minimal adequate to maintain the precipitated slurry adequately dispersed, free-flowing and non-sticky as observed through windows in the evaporator vessel 19, and to maintain a steady overall heat transfer coefficient (U). The brine salinity monitor 36 may be pre-set to open the brine blowdown valve when the desired concentration factor has been reached in the recycled brine, say 10 or 12-fold. The initial concentrated liquid slurry blow down 36b, DSSE blowdown) is wasted to the power plant brine disposal pond for a few days before the DSSE slurry tank 31 is then filled with this slurry. This reserved slurry is allowed to settle out and is stored as a startup seed slurry brine for future use. The DSSE system can then be adjusted for continuous automated operation: with the brine recycle pump and the vacuum pump in continuous operation, with the product distillate pump in either continuous use or on demand activated by a distillate level sensor in the DSSE condenser, and with provision for maintaining coolant flow, and by dispersant dosing at an adequate level. Daily checks on the constancy of the heat transfer performance is preferred. Constant performance is indicated by constancy of the condensate (or distillate) flow rate when proportioned to the available temperature difference (steam-side temperature less brine-side temperature), or, more precisely by calculating the overall heat transfer coefficient U on a daily or other periodic basis, whereby U is obtained from the formula:

$U = Q/A \times DT$ in Btu per Hr-ft$^2$-° F. and wherein

Q = heat flux in Btu per Hr, obtained from condensate flow,

A = total steam-side heat transfer surface area in ft$^2$,

DT = difference in steam-side to brine-side temperatures.

In the above typical WH-DSSE operation, it was observed that the overall heat transfer coefficient remained at or above 1000 Btu per Hr-ft$^2$-° F. when the steam-side temperature was at or above 115° F. and the DT was at or above 6° F., when reasonably good vacuum was maintained (due to absence of pump-seal leakage) and scaling or fouling was negligible. These condition were maintainable for 6 to 12 months in practical terms, provided that adequate brine recirculation and dispersant dosing were maintained.

PERIODIC OR OCCASIONAL DEFOULING OR DESCALING IN WH-DSSE

Continuous distillate production at rates close to or above 90% of design capacity is supported by an occasional defouling or descaling of the evaporator. This can usually be done within about 24 hours, and substantially without interrupting distillate production, because of the redispersion effects of DSSE additive. First, about 75% of the recycled brine slurry is either discharged into the slurry tank, or blown down. This blowdown is then replaced by adding, as feed to the DSSE unit, either freshwater or un-saturated liquid, and the brine salinity monitor 36 (in FIG. 2) is adjusted to a level below saturation for any solute in recirculation in the DSSE. Evaporation/distillation may then be continued with this freshwater (or non-saturated liquid) as feed make-up until the evaporator heat transfer performance has been restored to its full design capacity (above), or in about 24 hours. Normal WH-DSSE operation is then resumed by blowing down about 75% of this recycled wash water and by recharging the earlier brine slurry from the slurry tank, and resuming the normal feed procedure with cooling tower blowdown or wastewater feed. The addition of dispersant is not required during the descaling or defouling operation. The scaled and descaled conditions of the heat transfer tubes can be seen by entering the DSSE unit through a man-way, before and after descaling.

Scaling of the DSSE was deliberately imposed on several occasions for the purpose of testing the above descaling procedure. Scale deposit on the evaporator tubes was forced by reducing the recycled brine slurry flow to a rate below 2 gpm/tube (and well below the minimum design flow rate of 3 to 4 gpm/tube), maintaining the low flow rat until the overall heat transfer coefficient was observed to have been reduced substantially, from its typical range of 1000 to 1400 into a range of 600 to 900 Btu per Hr-ft$^2$-of (the levels within these ranges depended on the temperatures of the turbine exhaust steam available at the time). The brine slurry was then blown down, and the DSSE vessel was entered through the man-way. Scale was observed on the tube-side surfaces, and a sample was brushed off and analyzed, showing the following composition: Gypsum: 94.6%; Silica: 4.9%; Magnesium hydroxide: 0.57%.

This composition was essentially the same as that of the slurry precipitated at that time. The feed water at this time had a typical composition as follows, in main components, in mg/l; Calcium: 574; Magnesium: 210; Sodium: 735; Sulfate: 2716: Chloride: 574; Silica: 66.5.

This feed water was usually concentrated by a factor of 10 to 12, and the dispersant dosing level was typically 12 to 15 mg/l of feed flow rate. The dispersant was dodecylbenzene sulfonic acid, obtained as a commercial grade of 97–99% linear alkyl benzene sulfonic acids (LAS 99).

Descaling was usually complete after recycling freshwater over the DSSE tube-sides at 3 to 4 gpm/tube for 24 hours. Complete descaling was indicated by entering the DSSE vessel to observe complete visual absence or removal of the scale, by its redispersion and dissolution in the recycled freshwater wash, and confirmed by restarting the DSSE and observing restoration of the above typical performance within the range of 1000 to 1400 Btu per Hr-ft$^2$-of, responsive to the steam-side temperature.

ALTERNATIVE DESIGN PREFERENCES FOR DSSE USE

Several modifications of the basic process and design concepts of FIG. 2 are disclosed in FIGS. 3 a, b and c, and in FIG. 4 a, b and c, each of these utilizing the orifice plate and feed distribution system, as well as the seed slurry maintenance system and slurry storage vessel of FIG. 2 when applicable:

FIG. 3 a shows an arrangement that further increases the horizontal cylindrical vessel area cross section, for the slowing-down of vapor flow rates, by providing two such vessel areas 37 and 38 opposite from the central brine-vapor injection area 39 below the evaporation tube bundle, as well as additional mist elimination screen area. In this arrangement, provision can be made for vapor conduit connections 40 and 41 to an external or separate condenser vessel 41a located beside the evaporation and brine-vapor disengagement vessel, as indicated in FIG. 3b and c, as a plan view and end view, respectively.

FIG. 4 shows an arrangement preferred for the vapor compression (VC) mode of DSSE and wherein the evaporation temperature may be high (i.e. about 220° F.), low (i.e. about 100° F.) or anywhere intermediate of high and low, and whereby provision is made for separation of the process functions of feed distribution, evaporation, vapor-brine separation and brine-slurry control and recycle. In this arrangement, the vessel design could be conventional (vertical-cylindrical) for high temperature operation as shown in FIG. 4 a, or similar to FIG. 2 or 3, as shown in FIG. 4b, or to provide intermediate vapor slowdown and brine-vapor separation capacities, as in FIG. 4c.

In FIGS. 4a, b and c, the vapor compressor is schematically shown in the form of a pump connected to the vapor space of the evaporator below it with a vertical line, and discharging through a tangential line horizontally into the cylindrical tube bundle beside it.

In FIG. 4 a, with high evaporation temperatures, the specific vapor volume is low, with correspondingly low vapor flow rates, and a conventional vertical cylindrical design as shown provides adequate area for vapor-brine disengagement, but utilizes the feed distribution system and the slurry control by dispersant addition and vortex mixing of this invention as improvements.

In FIG. 4b, a low temperature DSSE with high vapor volume flow is provided for, wherein the vapor compressor (VC) may for instance be a fan (or ducted fan) type (or a low-pressure steam-jet compressor with additional condensation to be provided for as needed), and whereby maximal horizontal vapor flow area and slowdown are provided for by horizontal cylindrical vessel areas 42, 43 (horizontal extensions to the vertical vessel as in FIG. 4c is an alternative arrangement), and the brine slurry suspension in the vessel is controlled by imposing a vortex in the base area 44 through impingement of the falling brine on slanted vanes 45 to deflect this brine horizontally for maintaining vortex flow in the residual brine in the base area 44. Feed into the evaporator is provided through conduit and spray means to wash the mist elimination pads 46 and to control solids and brine build-up therein, as well for control of excessive foam build-ups in the vessel as before in FIG. 2.

In FIG. 4c, for an intermediate specific volume of vapor produced, the horizontal area to provide adequate slowdown for disengagement of vapor and residual brine is provided by one or more horizontal cylindrical vessels 47 attached to the vertical cylindrical evaporation vessel 48, to provide sufficient vapor flow area to slow down vapor flows and allow dropout of liquid therefrom before final mist elimination of the vapor is achieved through the mist elimination screens or pads 49.

In FIG. 5, an alternative movable orifice plate 51 for downflow DSSE feed distribution on to the inside walls of evaporator tubes 52 as layers comprising vapor, solids and liquid, is shown.

The movable orifice plate 51 has orifices 53 (i.e. drilled or stamped therethrough) at positions out of axial alignment with the tubes 52 for controlling evaporator feed flow therethrough, and for directing such feed flow for impingement onto the upper tube sheet 54 or into a pool of feed liquid formed above the upper tube sheet 54. Attached to the orifice plate 51 are feed deflectors 55 such as tube sections, cylinders or the like that are concentric with said tubes 52 and can fit slideably thereinto to form or to provide annular spaces between said feed deflectors 55 and the inner walls of said tubes 52. Said annular spaces provide for the distribution of the liquid-vapor-solid slurry as annular layers for flow downward over the inner walls of said tubes 52. Said deflectors may be tapered towards their lower ends 56 such that the annular spaces are variable in width, or flow cross section, to provide a means for varying annular feed flow rates by moving said orifice plate up or down whereby said tapered deflectors are moved out of or into said tubes 52. Said orifice plate and feed deflectors are designed to provide that a pool of feed can be formed above said tube sheet and to promote the formation of a foamy layer comprising vapor and liquid, by the injection or flow of feed through said orifices.

The orifice plate 51 is moveably mounted within the feed inlet plenum 57 by supporting it from (or by) an orifice plate adjusting mechanism 58 similar to those disclosed in co-pending application Ser. No. 415,088, now U.S. Pat. No. 4,511,432 to provide a variable gap 59 between said orifice plate and said tube sheet wherein foaminess can be initiated or formed, stabilized, or maximized. Said gap 59 being adjustable so as to maximize the thermal performance of the DSSE (or VTFE) process, including automation of the variation of said gap 59 to thereby maximize the rate of condensate or distillate production by this method of DSSE or VTFE application. This is in accordance also with the co-pending Ser. No. 415,088. Automation of the adjustment of the gap 59 to achieve or approach a maximum productivity rate of distillate, or to maximize the thermal efficiency of the evaporation process can rely upon a signal from a distillate or a condensate flow monitor, or it can rely on a measurement of the tube-side pressure drop to vary the gap automatically, as discussed in co-pending Ser. No. 415,088 and in U.S. Pat. No. 4,511,432. As in Ser. No. 415,088 VTFE thermal performance is in general inversely proportional to the tube-side pressure drop.

FIG. 6 shows the alternative fixed orifice plate of FIG. 2 in greater detail. In this arrangement, the gap 60 between the orifice plate 61 and the tube sheet 62 is predetermined and fixed, and depends upon the length, if any, of the tube extension above the tube sheet 62, to form a pool of liquid or foam or slurry 63 above the tube sheet 62 by injecting or flowing feed or feed slurry through the orifices 64 into said pool 63. Such jets of liquid are designed to turbulate the pool 63 and to create phase mixing therein by for instance flashdown of the feed liquid within these jets, or by ingesting or drawing vapor from within the gap into the pool 63 or by mixing such vapors into said pool by creating turbulence therein. The foamy pool 63 can for instance comprise liquid and vapor or liquid, vapor and solids precipitated therein. This foamy material is then caused to flow or to overflow into the tubes as mixed-phase annular layers. The distribution of feed to all tubes can be improved by several means, for instance by serrating or slotting the upper edges 65 of the tubes extending above the upper tube sheet. Also, flow deflectors i.e. such as 66, 67, 68 can be located in or near the upper ends of the tubes. Such deflectors can form annular spaces with the tube inside walls or direct (deflect) annular flows into the tubes, and can take different forms, for instance such deflectors 66 can be attached to the orifice plate 61; alternatively, such a deflector 67 can be attached to the upper end of a tube to form an annular space for channeling flow onto the tube wall. Excessive or additional flow can overflow the top edges of inserted deflectors 67 or 68, one type 68 being serrated, jagged, notched, etc., and the other type 67 smooth edged. In either case, they act as tube extensions and can be an alternative to actually extending the tubes above the tube sheet 62. The tubes 65 can thus either be extended above the tube sheet 62 and have smooth or serrated upper ends, or have upper ends that are approximately even or flush with the tube sheet upper surface. In the case of extended tubes, distribution of some feed into the tubes may be through perforations in the extended side walls of the extended tubes, for instance through small holes, to improve feed distribution to evaporator tubes.

FIGS. 5 and 6 have major features and objectives in common: To form a pool of feed liquid (or of foamy vapor-liquid feed or of foamy vapor-liquid-solid feed) between the orifice plate and the upper tube sheet, and to direct the feed into the tubes as annular layers (or as annular foamy vapor-liquid or vapor-liquid-solid layers).

These features are similar to the feed distribution for upflow evaporation in the parent U.S. Pat. No. 4,511,432 at page 5 lines 29 to 41:

The interstitial orifices allow a portion of the feed to impinge against the inlet tube sheet, ensuring that the manifold remains flooded. Such flooded condition is desirable to promote equal flow to all tubes and to prevent dry or stagnant operation in the manifold which can lead to scaling from salts present in the feed.

The same applies in the present downflow DSSE use as well as in VTFE application, and also in conventional downflow VTE use.

The feed flashdown and distribution system shown in FIG. 5 is useful in or applicable for both the downflow and the upflow modes of evaporation. It is essentially the same as disclosed "for Use with both Upflow and Downflow VTFE" in FIG. 5 of my Aug. 20, 1982 materials mailed to the U.S. Patent Office under the Disclosure Document Program, and is incorporated herein by reference. Both of these FIGS. 5 are also analogous to FIGS. 4 and 5 in Ser. No. 415,088 and in U.S. Pat. No. 4,511,432; and this is a CIP of a CIP application thereof. The feed distributor in FIG. 6 is analogous to the fixed orifice plate of FIG. 3 in Ser. No. 415,088 and in U.S. Pat. No. 4,511,432.

I claim:

1. A method for evaporating a liquid from a solution containing species tending to form a deposit on a heat transfer surface dissolved in said liquid, said method comprising:
   (a) suspending solid particles including precipitate of said species to provide precipitate surfaces in said solution and adding a dispersant thereto, said dispersant consisting essentially of an anionic monomeric surfactant having liquiphilic groups associating with said liquid and having liquiphobic groups aligned toward solid surfaces including said heat transfer surface and said precipitate surfaces, said dispersant imposing negative common charges on said surfaces to inhibit formation of said deposit on said heat transfer surface;

(b) flowing the product of step (a) over said heat transfer surface as a slurry containing liquid and solid particles;

(c) heating said slurry across said heat transfer surface to evaporate liquid from said slurry, resulting in formation of vapor flowing at a flow rate with respect to said heat transfer surface;

(d) reducing said rate of flow of said vapor to substantially improve separation of mist droplets from said vapor; and (e) maintaining residual liquid and solid particles after steps (c) and (d) in a solid-liquid slurry by collecting said residual liquid and solid particles in a pool and by imposing rotational flow within said pool.

2. The method in accordance with claim 1 in which said heat transfer surface is comprised of a plurality of vertical tubes in a vertical shell-and-tube heat exchanger, and step (b) comprises discharging the product of step (a) through a plurality of orifices surrounding the inlet ends of said vertical tubes to provide a slurry containing liquid and solids for flow into said plurality of tubes.

3. The method in accordance with claim 1 in which said dispersant being incorporated with said deposit eventually formed on said heat transfer surface provides for an improved removal of said deposit eventually formed from said surface with said liquid, 4. A method for evaporating a liquid from a solution containing species dissolved therein tending to precipitate, and the precipitate tending to form deposit on a heat transfer surface, said method comprising:

(a) suspending solid particles including precipitate of said species in said solution and adding a dispersant thereto, said dispersant consisting essentially of dodecylbenzene sulfonic acid for improving the redispersion of said deposit in said liquid;

(b) flowing the product of step (a) over said heat transfer surface as a slurry containing liquid and solid particles; and (c) heating said slurry across said heat transfer surface to evaporate a portion of said liquid, wherein the added dispersant maintain said precipitate as a non-sticky suspension thereof in said slurry.

5. The method in accordance with claim 4 in which said heat transfer surface is comprised of a plurality of vertical tubes in a vertical shell-and-tube heat exchanger, and step (b) comprises discharging the product of step (a) through a plurality of orifices into a gap adjacent the inlet ends of said vertical tubes to provide a mixture of liquid and solid particles in said gap, for distribution of said mixture into said tubes as annular layers having their rates of flow controlled to evaporate said portion of said liquid with maximized thermal performance.

6. The method in accordance with claim 4, in which step (c) results in forming vapor flowing at a linear velocity with respect to said heat transfer surface; said method further comprising:

(d) reducing said linear velocity of said vapor to enhance the separation of mist droplets from said vapor; and (e) maintaining residual liquid and solid particles remaining after steps (c) and (d) in a solid-liquid slurry by collecting said liquid and solid particles in a pool and by imposing rotational flow within said pool.

7. The method in accordance with claim 4, in which said heating of said slurry is done with waste heat including warm vapor obtained from flash-down under vacuum of warm liquid.

8. The method in accordance with claim 4, in which said heating of said slurry is done by vapor compression.

9. The method in accordance with claim 4, in which said heating of said slurry is done with steam in a multiple effect series of evaporators.

10. The method in accordance with claim 4 in which said dispersant added to said solution improves substantially the rate of redispersion of said deposit from said surface with said liquid, and provides prolonged periods of operation without deposit formation to thereby increase the productivity rate of an evaporator, and to improve the availability of said evaporator from about 578% to about 90%.

11. A method for evaporating a liquid from a solution containing species dissolved therein tending to precipitate, and the precipitate tending to form deposit on a heat transfer surface, said method comprising:

(a) suspending solid particles including precipitate of said species in said solution and adding a dispersant thereto, in which said dispersant is an anionic, monomeric surfactant having a liquiphilic group and a liquiphobic group, and wherein said dispersant aids in redispersion of said deposit eventually formed into said liquid; said dispersant being in part incorporated into said precipitate in part forming said deposit on said surface, said incorporated dispersant improving the redispersion of said deposit in said liquid;

(b) flowing the product of step (a) over said heat transfer surface in the form of a slurry containing liquid and solid particles;

(c) heating said slurry across said heat transfer surface to evaporate a portion of said liquid; and (d) inhibiting the formation of said deposit on said heat transfer surface.

12. A method for evaporating a liquid from a solution containing species dissolved therein tending to precipitate and to deposit on a heat transfer surface, said method comprising:

(a) suspending solid particles of said species in said solution and adding a dispersant thereto, said dispersant imposing a negative ionic charge on said precipitate consisting essentially of a linear alkylbenzene sulfonic acid;

(b) flowing said product of step (a) as a slurry containing liquid and solid particles over said heat transfer surface;

(c) said dispersant being in part disposed over said heat transfer surface as a thin film thereon and imparting a negative ionic charge thereto and inhibiting said negatively charged precipitate in (a) from depositing on said heat transfer surface; and (d) heating said slurry across said heat transfer surface to evaporate a portion of said liquid therein, wherein the dispersant added in step (a) is in the range of 3 to 100 mg/l of said solution.

13. A method of evaporating water from industrial waste water containing scale-forming species tending to foul or scale a heat transfer surface dissolved therein, said method comprising:

(a) suspending solid particles of said scale-forming species in said industrial waste water and adding dodecylbenzene sulfonic acid as a dispersant thereto, said dispersant improving the rate of descaling of scale including said species with non-saturated water used for descaling;

(b) flowing the product of step (a) over said heat transfer surface to form a slurry containing liquid and solid particles; and (c) heating said slurry across said heat transfer surface to evaporate water therefrom, wherein said solid particles include calcium sulfate, and wherein said scale formed includes calcium sulfate with said added dispersant partially incorporated therewith, said dispersant being added to substantially inhibit said formation of scale on said heat transfer surface and to improve redispersion of said calcium sulfate eventually formed on said heat transfer surface in water.

14. The method in accordance with claim 13, in which said heating of said slurry is done with waste heat including turbine reject steam.

15. A method of evaporating water from saline water containing species tending to precipitate and to form a deposit on a heat transfer surface dissolved therein, said method comprising:

(a) suspending solid particles including said species in said saline water and adding a dispersant thereto, said dispersant consisting essentially of an anionic surfactant, said dispersant redispersing said deposit with a fresh water;

(b) flowing the product of step (a) over said heat transfer surface to form a slurry containing liquid and solid particles;

(c) heating said slurry across said heat transfer surface to evaporate water therefrom, in which said heat transfer surface is a surface of an evaporator.

(d) descaling or defouling of said heat transfer surface by: discharging liquid with suspended particles dispersed therein from said evaporator;

(e) recirculating a non-saturated water over said heat transfer surface;

(f) partially evaporating said non-saturated water and condensing the vapor to produce distillate while adding fresh water feed to said recirculating water in (e) to maintain non-saturation of said recirculating water for up to about 24 hours, and (g) after removal of said deposit, recharging said evaporator with said liquid and suspended particles therein discharged in (d), and resuming evaporation of water from said saline water.

16. The method in accordance with claim 15, wherein said saline water comprises seawater.

17. A method of evaporating water from seawater containing deposit-forming species dissolved therein, said species tending to precipitate and to form a deposit on evaporator surfaces, said method comprising:

(a) suspending solid particles including said deposit-forming species in said seawater and adding a dispersant thereto, in which said dispersant consists essentially of a monomeric anionic surfactant, said dispersant being in part incorporated with said species during precipitation thereof and improving the rate of redispersion of said precipitated deposit of said species in water; and said dispersant inhibiting the formation of said deposit on said surfaces by imposing common negative charges on said precipitate and said evaporator surfaces;

(b) flowing the product of step (a) over a heat transfer surface to form a slurry containing liquid, vapor and solids; and (c) heating said slurry across said heat transfer surface to evaporate water therefrom said heating including use of steam from a coastal power plant.

* * * * *